Oct. 2, 1934.    J. L. CREVELING    1,975,312
LUBRICATING DEVICE
Filed Sept. 17, 1931    2 Sheets-Sheet 1
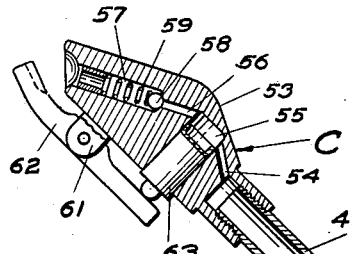
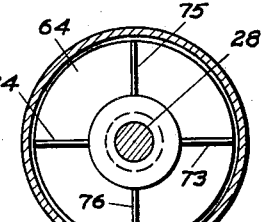
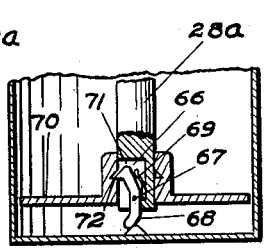
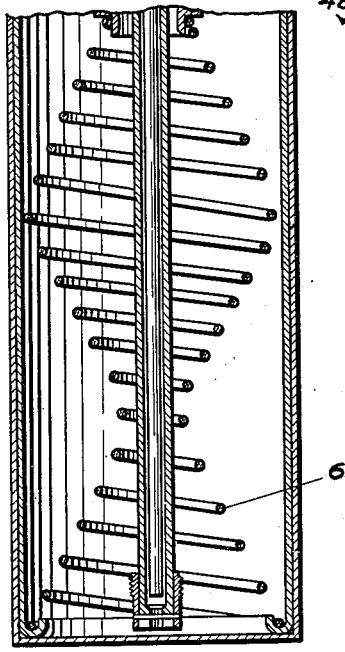
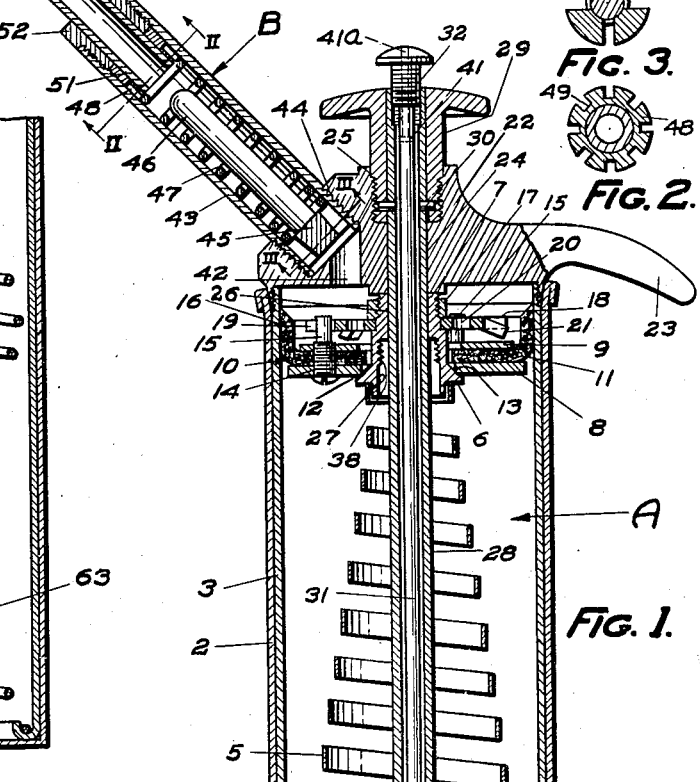
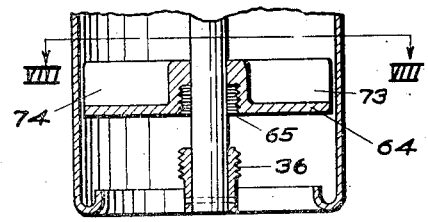
INVENTOR.
JOHN L. CREVELING
BY
ATTORNEY.

Oct. 2, 1934.  J. L. CREVELING  1,975,312
LUBRICATING DEVICE
Filed Sept. 17, 1931  2 Sheets-Sheet 2

INVENTOR.
JOHN L. CREVELING
BY John A. Watson
ATTORNEY.

Patented Oct. 2, 1934

1,975,312

UNITED STATES PATENT OFFICE 1,975,312

LUBRICATING DEVICE

John L. Creveling, Tucson, Ariz., assignor to The Lubrication Corporation, South Bend, Ind., a corporation of Delaware Application September 17, 1931, Serial No. 563,412

18 Claims. (Cl. 221—47.4)

This invention relates to lubrication devices. More particularly it relates to hand pumps or guns by which lubricant may be supplied to lubrication fittings.

One of the objects of the invention is to provide a lubrication hand gun which is efficient in its action, conveniently operated, and easily refilled with lubricant.

A further object of the invention is to provide a lubricant gun having, in combination, a high pressure portion and efficient means for continuously supplying lubricant to said high pressure portion.

Further objects will be apparent from a reading of the subjoined specification and claims and from a consideration of the accompanying drawings.

In order to explain the invention more clearly several embodiments thereof are shown in said drawings, in which:

Fig. 1 is a view in section of a gun formed according to my invention;

Fig. 2 is a view in section of a detail taken substantially on the line II—II of Fig. 1;

Fig. 3 is a view in section taken substantially on the line III—III of Fig. 1;

Fig. 6 is a fragmentary view in section of a portion of a modified form of gun;

Fig. 7 is a fragmentary view in section of a portion of a gun of modified design;

Fig. 8 is a view in section taken substantially on the line VIII—VIII of Fig. 7;

Fig. 9 is a fragmentary view in section of a portion of a modified form of gun;

Figure 5:
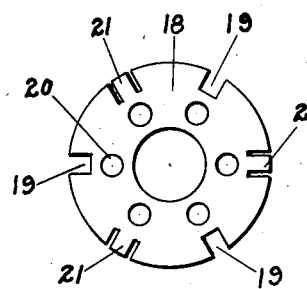
Fig. 5 is a view in top plan of a plate shown in Fig. 1.
Figure 4:
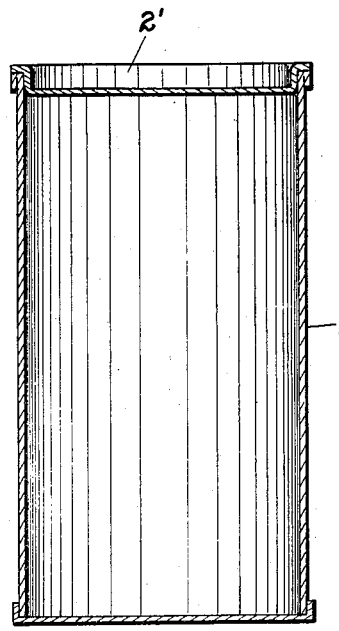
Fig. 4 is a view in elevation of a carton or container filled with lubricant and adapted to be used as a part of the gun illustrated.

Referring particularly to the drawings, there is shown in Fig. 1 a container portion A, a high pressure portion B, and a coupler C. There is included in the container portion A a detachable carton or container $a$, originally provided (as shown in Fig. 4) with a removable cover 2; the carton being adapted to transport from the factory to the place at which it is to be used for the lubrication of bearings. When the gun is in operation, lubricant is urged continually, from the container portion A and the carton associated therewith, to the high pressure portion B of the gun, and at the same time the high pressure portion B is operated intermittently to force the lubricant into the bearings to be lubricated. The container portion A also includes a metallic cylinder 3 formed with open ends and having the lower end flanged as at 4 for the reception of a conical coiled spring 5 which is adapted to aid in feeding the lubricant from the container and is also adapted to maintain a follower valve normally closed. Thus the upper end of the spring 5 bears upon a shoulder 6 formed on the under side of a valve member 7 which is the follower valve mentioned above. The valve 7 is slidably mounted in an axial opening formed in a follower or piston 10, said piston comprising a pair of circular metallic plates 8 and 9 and a non-metallic cup 11 secured between the plates 8 and 9. The valve is provided with a conical valve surface 12 which is adapted to seat in a beveled valve seat 13 formed in the plate 8. The plates 8 and 9 are secured to the cup 11 and to each other by screws 14 which have upwardly extending projections 15. The cup 11 has upwardly extending flanges 16 which are adapted to fit closely against the walls of the container 3 and prevent the passage of lubricant downwardly past said cup. Secured to the valve 7 by a nut 17, but normally spaced above the piston 10, is a slotted circular plate 18 having slots such as 19 into which the upwardly extending projections 15 of the screws 14 are adapted to extend, to prevent relative rotation, and holes such as 20 for the passage of lubricant. The plate 18 is also provided with a plurality of pairs of adjacent saw cuts (shown most clearly in Fig. 5) and the portions of the plate between each pair of cuts is bent down to form a plurality of tongues 21 which limit the downward movement of the plate 18 relative to the plates 8 and 9. It may be seen therefore that the valve 7 has a limited range of movement but may be moved to open or to closed position. Moreover, it is clear that, inasmuch as the spring 5 resiliently urges the valve 7 upwardly, and inasmuch as friction and lubricant in the container both resist upward movement of the cup 11, the spring 5 normally maintains the valve 7 and the plate 18 in the position shown, so that the valve formed by the surface 12 and the seat 13 is closed to prevent the passage of lubricant downwardly.

Means are provided for venting the interior of the container so that additional lubricant may be supplied thereto. Moreover, means are provided for moving the piston, formed by the plates 8 and 9 and the cup 11, downwardly through the newly supplied lubricant and for allowing the passage of said lubricant upwardly through the piston in refilling the container. That is to say, the parts are so arranged that when the gun is being prepared for service, a filled carton 2 may be telescoped over the container 3 with the piston in the position shown in Fig. 1, and the container 2 associated with the gun parts by the insertion of said parts into the container so that an operative gun is formed. In a sense it may be said that the lubricant is thus forced into the container 3. After the carton 2 has been operatively associated with the gun parts, the piston may be moved downwardly through the lubricant to a position in which it can become effective to force the lubricant into the high pressure portion of the gun. A cap 22 is secured onto the upper end of the container 3. The cap 22 has associated therewith a handle 23, and is provided with a plurality of concentric bores such as 24 and 25, aligned respectively with concentric bores 26 and 27 formed in the valve 7. The bores 26 and 24 have the same diameter, and passing through them is a hollow rod 28 having a corresponding diameter and therefore adapted to form a lubricant tight fit therein. Threaded into the bore 25 is a tubular plug 29 secured to the rod 28 by an offset pin 30. Extending downwardly through the hollow of the rod 28 is a solid rod 31, the upper end of which is secured to a screw 32 threaded into the hollow rod 28, the screw 32 being normally only screwed down part way as shown. The lower end of the hollow rod 28 is provided with a nut 34, secured by a pin 40 and formed with external threads 36 adapted at times to be threaded into internal threads 38 formed within the bore 27. The bore of the rod 28 is constricted at its lower end as at 39. The upper part of the rod 31 and the screw 32 are formed with intersecting bores 41 and 41a.

It may thus be seen that the rod 31 may be withdrawn entirely from the hollow tube 28 or forced farther down in the bore, thus closing the constricted portion 39 and preventing air or lubricant from passing into the hollow shaft. It may be seen that by unscrewing the plug 29, and either leaving the rod 31 and screw 32 in the position shown in the drawings or removing them entirely, the plug may be removed from the cap 22, and the rod 28, together with the rod 31, may be lifted until the thread 36 may be screwed into the internal threads 38 in the plug 7. A new carton 2 of lubricant is then telescoped over the container 3 from the bottom, and lubricant from the new carton 2 entering the container will drive out the air in the container through bores 39 and through the main bore of the hollow rod 28, and the lubricant will take the place of the air beneath the follower 10. The telescoping of the carton 2 over the container 3 "irons out" any dents which may have been previously formed in the light side walls of the carton. The rod 31 may then be reinstated and/or screwed down, and thereafter, by pressure exerted upon the plug 28, the piston 10 may be forced down through the lubricant, the lubricant passing the piston through the axial openings (inasmuch as the valve surface 12 will obviously be moved away from the valve seat 13) and passing through holes 20 in plate 18. When the piston 10 has been moved to a position at the lower end of the container 3 and the spring 5 thus compressed, the plug 29 may be screwed into the bore 25 thus automatically unscrewing the nut 36 and the rod 28 from the piston. The rod 31 should next be unscrewed to the normal position shown in the drawings, so that air in the container below the piston 10 may be vented through the constricted bore 39, the main bore of the rod 28, and the bores 41 and 41a formed in rod 31 and screw 32. The spring 5 then urges the piston 10 upwardly, thus tending to force the lubricant upwardly and into the high pressure portion B.

The cap is provided with a bore 42 through which lubricant may pass into the sleeve 43 which forms a part of the high pressure gun B. The sleeve 43 is screwed into the cap 22 at an angle of about 45 degrees to the axis of the container portion A, as at 44, and is provided, adjacent to its inner end, with a spider 45, (shown most clearly in Fig. 3). Secured to the spider 45 is a solid plunger 46, and surrounding the plunger 46 and bearing upon the spider 45 is a compression spring 47. The upper end of the spring 47 bears upon a grooved washer 48 (shown most clearly in Fig. 2), which is secured to the lower end of a tubular plunger 49, screwed into a coupler C which includes a bored member provided with a plurality of bores such as 54, 55, 56, and 57. Mounted in the bore 57 is a check valve 58 held upon its seat by a spring 59 and adapted to allow lubricant to pass out but to prevent lubricant or air from passing in. Secured to the side of the casing 53 of the coupler C, and forming a part thereof, is a lug 61 on which is pivotally mounted a lever 62, formed with a claw for clamping a lubrication fitting. Mounted in the bore 55 is a plunger 63 having its outer end bearing upon one end of the lever 62 and adapted under the influence of lubricant pressure to force the claw of the lever 62 into clamping relationship with the fitting which is to be lubricated. The coupler C described above is described and claimed in my copending application Serial No. 563,401.

The loading of the gun has been described above. Should it be desired to lubricate a fitting, the coupler C is placed over the fitting and pressure is exerted by pushing on the gun with the hand in the angle between the carton 2 and the handle 23. This forces the hollow plunger 49 to telescope within the sleeve 43, compressing the spring 47. The plunger 46 thus enters the hollow plunger 49 trapping lubricant therein, and further movement of the plunger forces lubricant out through the bores 54, 55, 56, and 57 into the fitting to be lubricated. Release of manual pressure by the operator allows the spring 47 to extend the tubular plunger 49 to the position shown in Fig. 1 and thus withdraws the solid plunger 46 from the hollow thereof. Inasmuch as the valve 58 prevents lubricant from returning inwardly to the tubular plunger 49 from the outer end, a partial vacuum is created in the plunger 49 and in the sleeve 43 so that when the solid plunger 46 is entirely withdraw from the hollow plunger 49, the spring 5 and piston 10 force lubricant through the spider 45 and the sleeve 43, into the hollow plunger 49, to again fill said hollow plunger. The telescoping and release of parts is repeated as desired, but it is to be noted that on the telescoping stroke, after the solid plunger 46 has entered the hollow plunger 49, lubricant trapped in the outer end of the sleeve 43 will not block the telescoping of the hollow plunger because said lubricant may pass through the grooves formed in the washer 48.

In Fig. 6 there is shown a portion of a container similar in all respects to the container shown in Fig. 1, with the exception that instead of the simple conical spring 5 there is provided a triple conical spring 63. Thereby it is possible to use a lighter spring and at the same time minimize the danger of having the spring buckle.

The portion of container shown in Figs. 7 and 8 differs from that shown in Fig. 1 only in that, instead of a spring urged piston 10 tightly fitting against the walls of the container, there is provided a loosely fitting metallic follower 64 formed with an internal threaded socket 65 into which the plug 36 may be screwed. The follower 64 is provided with a plurality of baffles such as 73, 74, 75, and 76, which aid in preventing the follower from turning in the lubricant and which thus allow the rod 28a to be more readily screwed onto and unscrewed from the follower. Several other devices might be provided to prevent the follower from turning during the fastening process. For instance, there might be provided a latch or screw in the bottom of the container adapted to engage with the follower, or there might be lugs or screws secured to the sides of the container near the bottom.

In Fig. 9 I have shown a still different means for releasably securing a piston or follower to the lower end of a rod. Therein the rod 28b is provided at its lower end with a slot 66, in which is pivotally mounted at 67 a latch formed by a lever 68, resiliently urged counter clockwise (as seen in Fig. 9) by a leaf spring 69. A follower 70 is adapted at times to be associated with the lower end of said rod 28a, and is formed with a pocket 71 having an annular shoulder 72 upon which the upper end of the lever 68 is adapted at times to catch.

Figure 10:
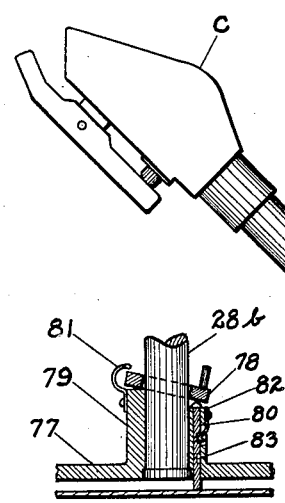
Fig. 10 is a fragmentary view in side elevation of a follower and associated mechanism adapted to be used in a gun of modified design.

Moreover, other mechanical means could be provided for releasing the rod from the follower. In Fig. 10 I have shown a ring clutch in which a rod 28b may be secured to a follower 77 by a slightly oversized ring 78 adapted normally to rest upon a support 79 formed with the follower 77 and maintained in operative relationship therewith by a guide 81. A relatively low support 82 formed on the follower 77 opposite to the support 79 is formed with a bore and carries slidably mounted therein a pin 83 which is adapted to be held in either one of two positions by a detent 80. It is adapted when the follower and rod reach the lower end of the container to contact with the bottom of the carton and thus move the ring 78 upwardly into a horizontal position in which the follower 77 may easily slide up the rod. When the follower approaches the top of the container, a projection on the ring 78 contacts with the top and moves the ring and pin back to the position shown.

Figure 11:
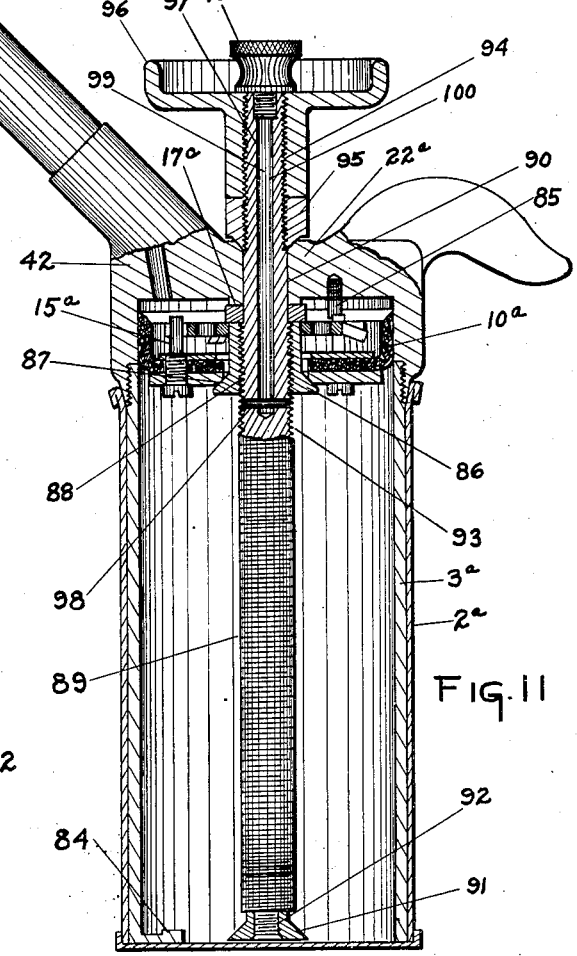
Fig. 11 is a view partly in section and partly in elevation showing a modified form of gun.

In Fig. 11 is shown a gun similar in many respects to the gun shown in Fig. 1. However, there are provided several additional features and several features differ in their specific construction from the gun shown in Fig. 1. Additional means are provided to prevent the piston 10 from turning. The container 3a is provided adjacent to its lower end with a lug 84 which is adapted to contact with the head of one of the screws 15a to prevent the piston 10a from turning when in its lower position, and in the head 22a there is inserted a stop pin 85 adapted to contact with one of the screws 15a to prevent the piston from turning when at its upper position.

Different means are provided for moving the piston to its lower position and for raising the piston to force lubricant into the high pressure gun. The piston 10a is provided with a valve member 86 of slightly different shape from the valve member 12. This valve member 86 is provided with conical shoulders adapted to cooperate with a beveled portion of the piston 10a to form a valve. Extending throughout the valve member 86 is a concentric bore having an internally threaded portion 88 in which there is screwed a rod 89 which serves to move the piston 10 up and down. The rod 89 has secured to its lower end an enlarged portion 91 adapted to limit the downward movement of the valve member 86. The rod 89 above the reduced portion 92 has a threaded portion 93 extending throughout the greater portion of its length formed with a thread adapted to cooperate with the internal thread of the valve member 86. Above such threaded portion 93 the rod 89 is reduced in its size as at 90 so as to pass through an axial bore formed in the cap 22a. At the upper end, the reduced portion 90 is threaded as at 94 and the rod is secured in place within the cap 22a by a nut 95 and a handle member 96 which acts as a lock nut and also as a handle for turning the rod 89. The upper portion of the rod 89 is provided with a longitudinal bore 97 extending downwardly to a point beneath the piston 10 when the piston is in its upper position as shown in Fig. 11, and connected at its lower end with a lateral bore 98 also beneath said piston 10. A plug 99 having a stem 100 and a head 101 is normally adapted to close the bore 97. Were the stops 84 and 85 not provided the piston 10a might jam at the upper end or lower end of the container on the threads on the rod 89 and turning with the rod through the lubricant prevent movement up and down thereof.

In filling this form of gun (with the parts in the position shown in Fig. 11 and the gun empty) the operator first removes the plug 99 so that the interior of the container may be vented. Next, he removes the empty carton 2a and replaces it with a full carton which is telescoped over the container 3a, thus forcing the lubricant up into the container 3a, the air in the container and any excess lubricant being vented through the bores 98 and 97. After the full container has been moved to the position of the carton 2a shown in Fig. 11, the plug 99 is restored and the handle 96 is rotated. Inasmuch as the piston 10 is initially prevented from turning by the contact of one of the screws 15a with the stop screw 85, the valve member 86 is forced down along the rod 89, thus opening the valve passage and allowing the lubricant to pass upwardly therethrough. This allows the piston 10a to move down through the lubricant, and the resistance of the lubricant during the passage downwardly of the piston prevents subsequent rotation of the piston. Thus the piston 10a is gradually moved to the bottom of the container 3a. The operator next inserts the plug 99 and then turns the handle 96 in the opposite direction to that in which it was previously turned. Inasmuch as the piston is initially prevented from turning by the stop 84, the rotation raises the valve member 86, causes it to seat firmly, and prevents the passage of lubricant downwardly through the piston 10a. Thus the lubricant is forced upwardly through the bore 42a of the cap 22a into a high pressure gun B, and then may be forced by said gun B into the fitting to be lubricated.

It is to be understood that the above described embodiments of my invention are for the purpose of illustration only and various changes may be made therein without departing from the spirit and scope of my invention.

I claim:

1. In a lubrication device, a container comprising, a cylinder having an outlet and an inlet end, a lubrication pump associated with the outlet end of said cylinder, and a replaceable cylindrical cartridge telescopically fitted over and engageable with said cylinder for supplying said cylinder with lubricant.

2. In a lubrication device, a container having an outlet in one end and having a closed end, a piston within said container having an opening, means for urging said piston toward said outlet end of said container, a rod extending through said container from said outlet end and through said opening in said piston into said closed end, and means associated with the inner end of said rod for releasably engaging with said piston.

3. In a lubrication device, a container formed with a closed end and with an end having an outlet, a follower positioned in said container having an axial opening formed therethrough, a rod in said container having its inner end normally extending through said follower to a point adjacent to the closed end of said container, and means associated with said inner end of said rod for selective engagement with said follower.

4. In a lubrication device a lubricant container, means for withdrawing lubricant therefrom, a follower in said container, a rod inserted inwardly through said container and through said follower, a latch pivotally mounted upon the inner end of said rod and adapted to engage with a portion of said follower to connect said follower to said rod and means for releasing said latch when the follower is moved to the remote end of said container.

5. In a lubrication device, a container, means for withdrawing lubricant therefrom, a follower in said container having a depression formed therein, and having a shoulder formed in said depression, a rod inserted inwardly through said container and through said follower, a latch pivotally mounted upon the inner end of said rod, a spring bearing on said latch whereby a portion of the latch is normally maintained against the shoulder formed on said follower, and means associated with the container for releasing the latch when the follower is moved to the remote end of the container.

6. In a lubrication device, a container, a piston for said container having an opening, a hollow rod extending into said container and through said opening in said piston and having openings for connecting the hollow of said rod with said container at the rear of said piston, and a plug for closing the outer end of said hollow rod.

7. In a lubrication device, a lubricant container, means for withdrawing lubricant therefrom, a piston within said container formed with an axial opening, a hollow tube extending inwardly of said container through said opening in said piston having its bore constricted adjacent to the inner end and having an opening for allowing communication between said container rearwardly of said piston and said tube and inwardly of said constriction, a rod inserted in said bore and extending downwardly to a point adjacent to said constricted portion, and a threaded plug secured to said rod adjacent to its upper end, said tube adjacent to its upper end being formed with screw threads engaging the upper part of said rod and by means of which said rod may be moved further into said tube to close said constricted opening.

8. In a lubrication device; a container having a closed end and an outlet end; a piston mounted in said container having a threaded opening formed therethrough, an exteriorly threaded rod formed with an axial bore and with radial bores extending from said axial bore to the container, inserted in said container, having the inner end thereof positioned adjacent to the closed end of the container, and having the threads screwed into said opening in the piston; and a solid rod forming a tight fit in said axial bore screwed thereinto.

9. In a lubrication device, a lubricant container having an outlet, a piston in said container comprising a metallic plate formed with an opening, a non-metallic cup associated with said plate and formed with an opening aligned with the opening in said plate and having its periphery pointing away from said plate, a second metallic plate positioned on the opposite side of said cup from said first named plate and also formed with an aligned opening, a third plate positioned adjacent to said second plate formed with an aligned opening and also having a slot formed therein, a screw securing said first named plate, said second named plate, and said non-metallic cup to each other, and engaging in said slot, a beveled valve secured to said slotted plate and extending through said aligned opening, and means bearing upon said valve for urging it into contact with said first named plate and to urge the piston ahead.

10. An article of manufacture comprising, a piston, said piston including a metallic washer; a non-metallic cup associated with said washer, a second metallic washer positioned on the opposite side of said cup, both of said washers and said cup being formed with axial openings; a valve positioned within said axial openings; and means adapted to bear on said valve for supporting said valve, for urging it to a closed position in said opening, and for thereby supporting and urging said piston forwardly.

11. In a lubrication device a container having an outlet in one end thereof, a non-metallic cup positioned within said container having an axial opening and having the periphery thereof pointing toward the end of the container having said opening, a pair of metallic washers formed with axial openings positioned on opposite sides of said cup, a screw for securing said washers and said cup together, a third washer associated with said cup and said first mentioned washers and formed with a slot through which a portion of said screw extends, a valve secured to said third washer and adapted to close said axial openings, and a spring bearing at one end upon the closed end of said container and at its opposite end upon said valve.

12. In a lubrication device, a container having one end closed and having the other end formed with an outlet, a piston in said container, a valve associated with said piston, said piston being substantially free to move in said container except as restrained by said valve, and a spring bearing at one end upon the closed end of said container and at the other end upon said valve.

13. In a lubrication device, a container having an outlet end, a piston in said container, means including a cartridge telescopically receivable over the side walls of said container for supplying lubricant to said container on the side of said piston opposite to said outlet end, and means for transferring the piston through the lubricant to the side thereof opposite to said outlet end.

14. In a lubrication device, a container having an outlet at one end thereof and having an opening at the opposite end, a lubricating pump connected to said outlet, a piston in said container, a carton of lubricant telescoped over said container so that the lubricant is forced into the open end of the container, and means for transferring said piston through the lubricant to the open end of the container so that it is in an operative position to force lubricant into the lubricant pump.

15. In a lubricating device, a lubricant receiving cylinder open at one end and provided with an outlet passage at the other end, a rod slidably mounted along the axis of said cylinder and extending exteriorly thereof, a piston slidably mounted on said rod, a lubricant cartridge open at one end and closed at its other end arranged for telescopic engagement over the outer walls of said cylinder whereby lubricant in said cartridge may be transferred to said cylinder, and means for detachably securing the outer end of said rod to said piston whereby the piston may be pushed through said lubricant to the remote end of said telescopically engaged cylinder and cartridge by pressure applied upon said rod.

16. In a lubricating device, a lubricant receiving cylinder open at one end and provided with an outlet passage at the other end, a rod slidably mounted along the axis of said cylinder and extending exteriorly thereof, a piston slidably mounted on said rod, a lubricant cartridge open at one end and closed at its other end arranged for telescopic engagement over the outer walls of said cylinder whereby lubricant in said cartridge may be transferred to said cylinder, means for detachably securing the outer end of said rod to said piston whereby the piston may be pushed through said lubricant to the remote end of said telescopically engaged cylinder and cartridge by pressure applied upon said rod, and means normally urging said piston toward said outlet passage.

17. In a lubricating device, a lubricant container having an outlet at one end and having the other end thereof closed, a rod slidably mounted in said container, a piston in said container, means operable at will for fixing said piston against substantial movement relative to said rod whereby the piston may be moved with said rod, and a valve associated with said piston and piston attachment means for passing lubricant through said piston upon the movement of said piston by said rod in one direction.

18. In a lubricating device, a lubricant container comprising a pair of telescopic members providing an outlet at one end and having the other end thereof closed, a rod slidably mounted in said container, a piston in said container, means operable at will for fixing said piston against substantial movement relative to said rod whereby the piston may be moved with said rod, and a valve associated with said piston and piston attachment means for passing lubricant through said piston upon the movement of said piston by said rod in one direction.

JOHN L. CREVELING.